United States Patent [19]

Nirasawa et al.

[11] 4,442,724

[45] Apr. 17, 1984

[54] ROTARY DIAL UNIT

[75] Inventors: Masami Nirasawa; Hideo Nigara, both of Kawasaki, Japan

[73] Assignee: Sakae Tsushin Kogyo Co. Ltd., Japan

[21] Appl. No.: 242,979

[22] Filed: Mar. 12, 1981

[30] Foreign Application Priority Data

Nov. 13, 1980 [JP] Japan .......................... 55-162306[U]

[51] Int. Cl.[3] ........................ F16H 35/18; G05G 5/06

[52] U.S. Cl. ...................................... 74/10.41; 74/531

[58] Field of Search ....................... 74/553, 531, 10.41

[56] References Cited

U.S. PATENT DOCUMENTS 3,031,035 4/1962 Tomita .............................. 74/10.41

3,236,119 2/1966 Popper ................................. 74/531

*Primary Examiner*—Kenneth Dorner

*Attorney, Agent, or Firm*—Hill, Van Santen, Steadman & Simpson

[57] ABSTRACT

A dial which includes a knob mounted on a rotary shaft and a dial surrounding the rotary shaft against which the knob may be positioned and including a base which rotatably supports the rotary shaft upon which the knob is mounted and clamp means between the knob and the base which comprises a brake shoe formed on a top surface of the base and in contact with a lower surface of the knob and a brake lever which has a projection such that in one position the projection engages the brake shoe to urge the brake shoe against the lower surface of the knob to lock it at a predetermined position. The brake shoe is formed with a slit in either its inner or outer flange and the brake lever is formed of a substantially similar circular shape which is rotatable within a groove and with the projection provided at one of the free ends of the brake lever.

4 Claims, 4 Drawing Figures

ROTARY DIAL UNIT

BACKGROUND OF THE INVENTION

1. Field of the Invention

The present invention relates generally to a rotary dial unit, and is directed more particularly to a rotary dial unit which is simple-structured, inexpensive and capable of retaining its adjusted position even if the knob thereof is vibrated or inadvertently touched, and hence is suitable for use with precision control instruments or the like.

2. Description of the Prior Art

In a variable resistor for precision control instruments, it is necessary that the slider thereof be held accurately at its adjusted position on the resistance element thereof, but in a prior art variable resistor the slider thereof may sometimes get out of the adjusted position due to vibrations applied to the variable resistor or an accidental touch thereto by the operator.

To avoid this, conventional variable resistors of this kind are provided with various clamp means. The clamp means employed in the past has, for example, such an arrangement that a brake lever for clamping use is turned to urge a brake shoe against the inner marginal edge of a knob of the variable resistor, or the peripheral surface of a cylindrical member rotatable with the rotary shaft of the knob concentrically therewith is pressed in the direction perpendicular to the lengthwise direction of the rotary shaft, or an annular surface of the base portion of the knob which is perpendicular to the lengthwise direction of the rotary shaft is pressed in the vertical direction, thereby preventing an unnecessary rotational movement of the knob.

In general, however, the abovesaid prior art clamp means are complex in construction, which is an obstacle to the manufacturing of rotary dial units at low cost.

OBJECTS AND SUMMARY OF THE INVENTION

Accordingly, it is an object of the present invention to provide a rotary dial unit which is simple-structured, inexpensive and ensures the clamping operation for the knob thereof.

According to an aspect of the present invention, a rotary dial unit is provided which comprises:

(a) a knob fixed to a rotary shaft to be rotatable therewith;

(b) a dial mechanism provided in association with said knob;

(c) a base for rotatably supporting thereon said knob and said dial mechanism; and (d) clamp means provided between said knob and said base;

said clamp means consisting of a brake shoe formed on a top surface of said base integral therewith, which is in contact with a lower surface of said knob, and a brake lever having a projection, said clamp means being so constructed that when said brake lever is rotated in its operating direction, said projection engages with said brake shoe to thereby urge said brake shoe against the lower surface of said knob to clamp said knob at a predetermined position.

The additional and other objects, features and advantages of the present inventin will become apparent from the following description taken in conjunction with the accompanying drawings through which the like references designate the same elements and parts.

DESCRIPTION OF THE PREFERRED EMBODIMENTS

With reference to the drawings, an embodiment of the rotary dial unit according to the present invention will hereinafter be described in detail as being applied to a multi-rotational type variable resistor.

Figure 1:
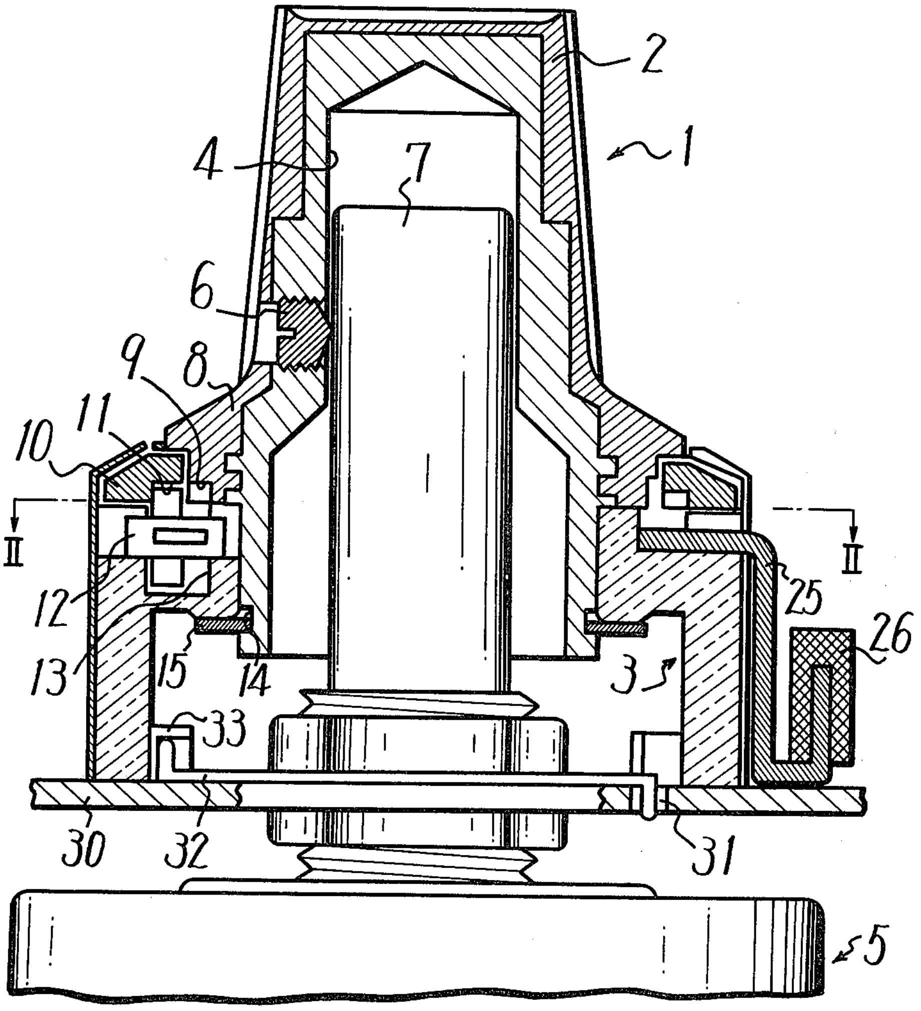
FIG. 1 is a sectional view illustrating an embodiment of the rotary dial unit of the present invention.

In FIG. 1 reference numeral 1 indicates generally an example of the rotary dial unit according to the present invention, which is composed mainly of a knob 2 and a base 3. The knob 2 has a hole 4, into which a rotary shaft 7 of a variable resistor 5 is fitted, and the knob 2 is fixed by a screw 6 to the rotary shaft 7 in a manner to be unmovable in its axial direction, but rotatable therewith. Reference numeral 30 designates a panel to which the variable resistor 5 is attached; 31 identifies a bore made through the panel 30; and 32 denotes a stopper for preventing the rotational movement of the variable resistor 5, which stopper is disposed between the bore 31 and a hooked retaining member 33 provided on the inside of the base 3 at the lower end thereof.

A base portion 8 of the knob 2 is formed as a rotary scale plate, which indicates one turn of the knob 2 by 100 uniform graduations. Reference numeral 9 indicates an inner gear or tooth provided at one position on the underside of the base portion or the rotary scale plate 8; and 10 designates a number-of-turns scale plate capable of indicating the number of turns of the knob 2 up to 20 turns in this example. On the underside of the number-of-turns scale plate 10 is provided an annular outer gear 11.

Under the number-of-rotations scale plate 10 a planetary gear 12 is disposed, which merely slides and does not mesh with the inner and outer gears 9 and 11 until the end of a first turn of the knob 5 but thereafter temporarily meshes with the inner and outer gears 9 and 11 to rotate the number-of-rotations scale plate 10 by one turn.

The base 3 on which the number-of-rotations scale plate 10 is mounted has a cylindrical configuration and the abovesaid planetary gear 12 is disposed in a recess 13 formed in the base 3.

A circular groove 14 is formed in the lower end portion of the knob 2 to extend over the entire circumference thereof and a fitting washer 15 is disposed between the groove 14 and the inside of the base 3, by which the knob 2 is rotatably engaged with the base 3.

Figure 2:
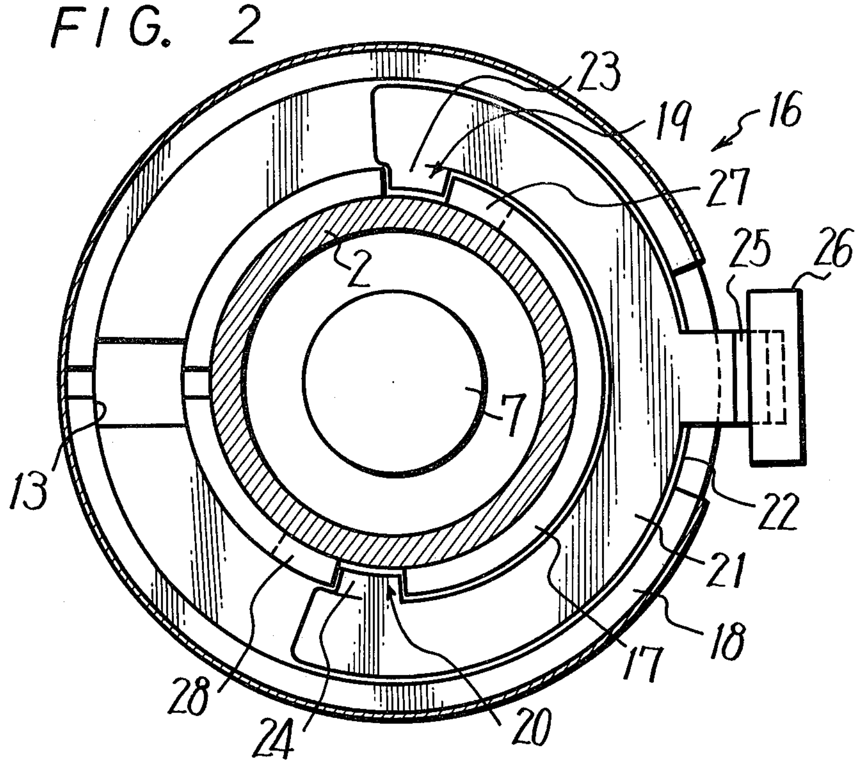
FIG. 2 is a sectional view taken on the line II—II in FIG. 1.

In the base 3 there is provided clamp means 16 such as shown in FIG. 2 for preventing that the rotary shaft 7, after once adjusted at a desired position, is moved out thereof by mechanical vibrations or an inadvertent touch as by the operator as described previously.

Next, a detailed description will be given of the clamp means 16 which forms the principal part of the rotary dial unit of the present invention with reference to FIG. 2 which is the cross-sectional view along the line II—II in FIG. 1, FIG. 3 which is a side view of the dial unit 1 showing partially in cross-section the clamp means 16 and FIG. 4 which is an explo perspective view of the clamp means 16.

The cylindrical base 3 has ring-shaped inner and outer flanges 17 and 18 formed integrally therewith on the inner and outer marginal edges of the top surface thereof opposing to the knob 2 and, in this example, a pair of substantially L-shaped slits 19 and 20 are respectively cut in the inner flange 17 at diametrically opposite positions to form brake shoes 27 and 28 on the inner flange 17 by the laterial slit portion of each of the slits 19 and 20. In the groove Gr defined between the inner and outer flanges 17 and 19 on the top surface of the base 3 is disposed a brake lever 21 described later. The outer flange 18 has a notch 22 to provide a relief for the base portion of the brake lever 21 or the vertically extended portion of a handle 25 which is hung down from the brake lever 21 when it is turned clockwise or counterclockwise through a predetermined rotational angle as will be described later.

Figure 4:
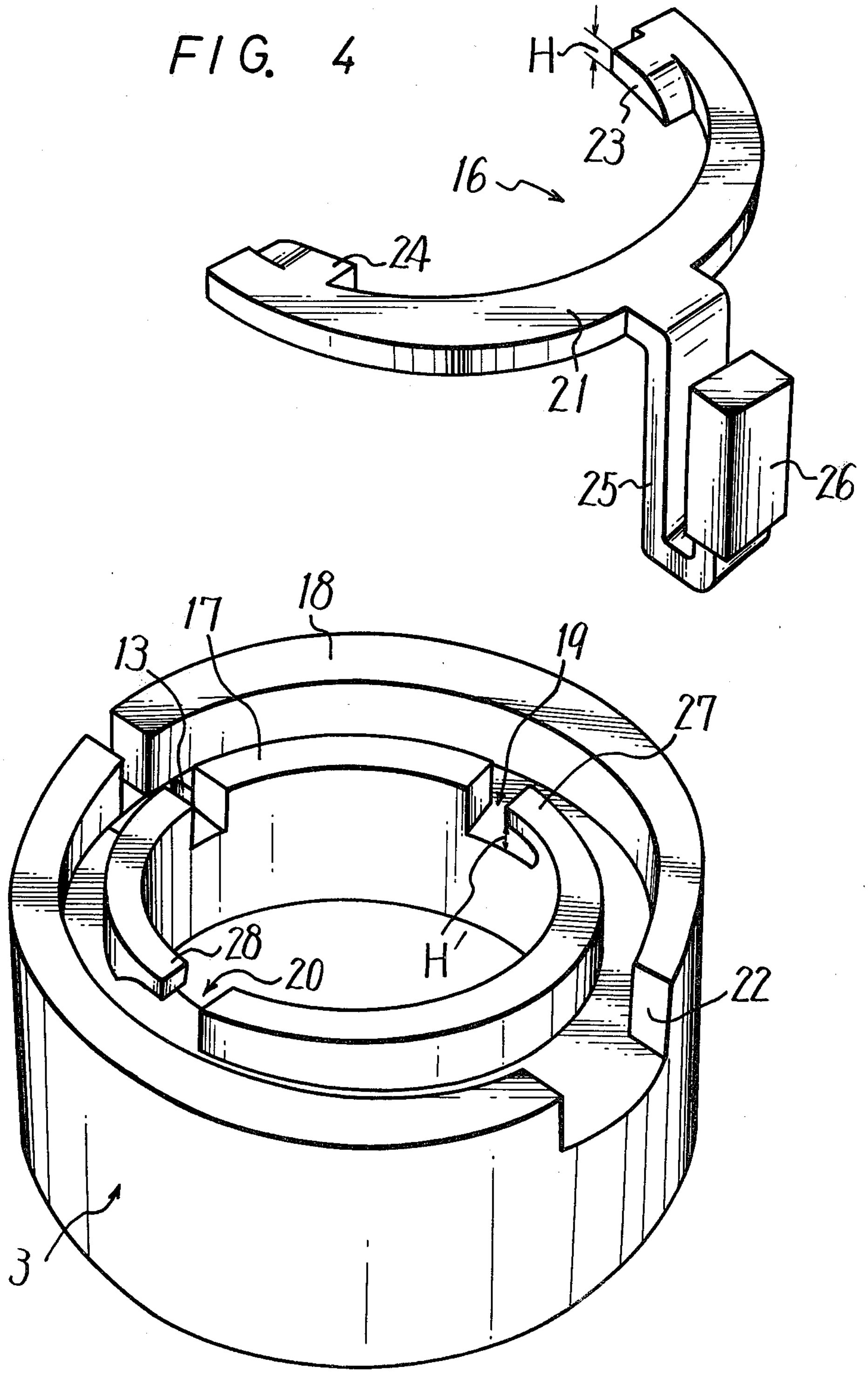
FIG. 4 is an exploded perspective view similarly showing the clamp means.

The abovesaid brake lever 21 is substantially semicircular in shape, as depicted in FIG. 4, and its one free end has formed integrally therewith on the inside thereof (on the side opposing the inner flange 17) a wedge-shaped projection 23 which is tapered off towards the center of the brake lever 21. The other free end of the brake lever 21 also has formed integrally therewith a similar wedge-shaped projection 24, which is tapered in the direction reverse to the wedge-shaped projection 23.

The thicknesses H of the base portions of the wedge-shaped projections 23 and 24 at thickest portion are selected equal to be a little larger than the depths H' of the slits 19 and 20 (in the axial direction of the base 3) so that when the wedge-shaped projections 23 and 24 are respectively pressed into the lateral slit portions of the slits 19 and 20, free ends of the inner flange 17 formed by the slits 19 and 20, that is, the brake shoes 27 and 28 are slightly pushed up, as described later.

The handle 25 for turning the brake lever 21 clockwise or counterclockwise, which extendds down from the center of the arcuate portion of the brake lever 21, is bent to project outwardly of the cylindrical base 3 and to provide a U-shaped portion at its lower end, and a knob 26 is mounted on the top of the handle 25.

Next, a description will be given of the operation of the abovementioned claim means 16. The brake lever 21 is disposed in the groove Gr defined by the inner and lower flanges 17 and 18, with the handle 25 projecting outwardly of the base 3 through the notch 22 (see FIG. 2). In this case, the pair of wedge-shaped projections 23 and 24 are respectively held in the vertical slit portions of the slits 19 and 20 cut in the inner flange 17 (see FIG. 3).

By gradually turning the knob 26 of the handle 25 of the brake lever 21 clockwise in the illustrated example, the wedge-shaped projections 23 and 24 are moved into the lateral slit portions of the slits 19 and 20, respectively. Since the depths H' of the slits 19 and 20 are selected to be smaller than the maximum thicknesses H of the wedge-shaped projections 23 and 24 as described above, the brake shoes 27 and 28 respectively made of parts of the inner flange 17 are biased upwardly as the wedge-shaped projections 23 and 24 are presseed into the lateral slit portions of the slits 19 and 20, respectively. As a result of this, the upper surfaces of the brake shoes 27 and 28 are strongly urged against the underside surface of the knob 2 to fix it to the base 3, thus clamping the knob 2 securely at its adjusted position.

While in such a clamped state, even if the variable resistor 5 is vibrated or inadvertently touched by the operator, the knob 2 does not turn and stays at the set position positively.

Figure 3:
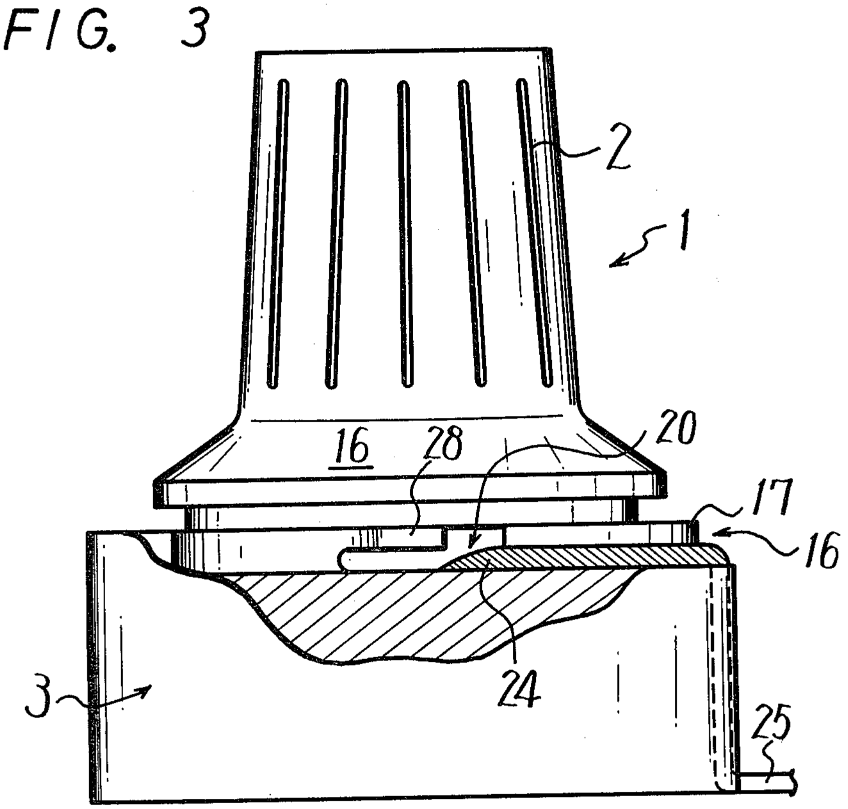
FIG. 3 is a side view showing, partially in cross-section, clamp means used in the embodiment of FIG. 1.

By gradually turning the knob 26 of the brake lever 21 counterclockwise, the wedge-shaped projections 23 and 24 are gradually disengaged from the lateral slit portions of the slits 19 and 20 and consequently the pressures applied by the brake shoes 27 and 28 to the underside surface of the knob 2 are removed little by little, finally releasing the knob 2 from the clamped state (see FIGS. 2 and 3).

As described above, according to the rotary dial unit of the present invention, the pair of slits 19 and 20 are cut in the inner flange 17 of the base 3 to form the brake shoes 27 and 28 for engagement with the underside surface of the knob 2 and the substantially semicircular brake lever having the pair of wedge-shaped projections 23 and 24 is turned to press the projections 23 and 24 into the slits, preventing an unnecessary turn of the knob 2. Since the above arrangement of the invention can be obtained only by providing the brake lever 21 other than the base 3, and since the clamp means 16, in particular, the slits 19 and 20 are formed in the base 3, the clamp means 16 can be constituted very easily; accordingly, rotary dial units of this kind can be produced at low cost. In addition, the present invention ensures the clamping operation in any type of rotary dial units.

It is also apparent that the rotary dial unit of the present invention is suitable for use with capacitors and other various elements as well as resistors.

While in the foregoing the pair of brake shoes 27 and 28 are described to be formed in the inner flange 17, it may be apparent that they can be formed in the outer flange 18, too. Further, the clamp means 16 is not limited specifically to the illustrated one.

It will be apparent that many modifications and variations may be effected by one skilled in the art without departing from the scope of the novel concepts of this invention.

We claim as our invention:

1. A rotary dial unit comprising:

(a) a knob fixed to a rotary shaft to be rotatable therewith;

(b) a dial mechanism provided in association with said knob;

(c) a base for rotatably supporting thereon said knob and said dial mechanism;

(d) clamp means provided between said knob and said base;

said clamp means consistingg of a brake shoe formed on a top surface of said base integral therewith, which is in contact with a lower surface of said knob, and a brake lever having a projection, said clamp means being so constructed that when said brake lever is rotated in its operating direction, said projection engages with said brake shoe to thereby urge said brake shoe against the lower surface of said knob to clamp said knob at a predetermined position, and in which said brake shoe is formed by providing a slit in one of inner and outer flanges which are provided on the top surface of said base integrally therewith, said brake lever is formed to be of a substantially semi-circular shape which is rotatably located within a groove defined by said inner and outer flanges and the top surface of said base, and said projection is provided at one of free ends of said semi-circular brake lever.

2. A rotary dial unit as claimed in claim 1, in which said projection is formed to be of a wedge-shaped and said slit is formed to be of a substantially L-shape, whereby when said brake lever is rotated in its operating direction and said wedge-shape projection moves in engagement with said L-shape slit forming said brake shoe, said brake shoe is urged against the lower surface of said knob to thereby clamp said knob at a predetermined position.

3. A rotary dial unit as claimed in claim 1, in which a pair of L-shaped slits are formed in one of inner and outer flanges planted on inner and outer marginal edges of the top surface of said base integrally therewith at diametrically opposed positions thereof to provide a pair of said brake shoes at the positions respectively, and said brake lever is formed to be of a semi-circular-shape and provided with a pair of projections at free ends thereof, respectively, each of which is of a wedge-shape to have a tapered surface thereon, said brake lever being rotatably disposed within a groove defined by said inner and outer flanges and the top surface of said base such that when said brake lever rests in non-operative position, said pair of wedge-shaped projections rest in vertical slit portions of said pair of L-shaped slits respectively, while when said brake lever is rotated in its operating direction, said pair of wedge-shaped projections come in engagement with lateral slit portions of said pair of L-shaped slits respectively to urge said pair of brake shoes against the lower surface of said knob to clamp the latter at a predetermined position.

4. A rotary dial unit as claimed in claim 1, in which said brake lever is provided with an operating handle which extends outside said base through a notch formed in said outer flange.

* * * * *